UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

998,596.   Specification of Letters Patent.   Patented July 25, 1911.

No Drawing.   Application filed September 13, 1910.   Serial No. 581,795.

*To all whom it may concern:*

Be it known that we, WILHELM BAUER, residing at Vohwinkel, and ALFRED HERRE and RUDOLF MAYER, residing at Elberfeld, Germany, doctors of philosophy, chemists, citizens of the German Empire, have invented new and useful Improvements in Vat Dye, of which the following is a specification.

Our invention relates to the manufacture and production of new and valuable vat dyestuffs. They are obtained by condensing isatin compounds in which the oxygen of the alpha-keto group is replaced by easily movable or replaceable substituents, *e. g.* halogen, sulfur, the amino group, the alkoxy group with 4-oxyacenaphthene of the formula:

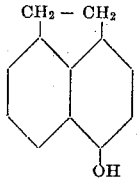

The new dyes are in a dry state dark blue crystalline powders with a metallic luster which are soluble in hot nitrobenzene generally with a blue coloration, and which yield with hydrosulfite and caustic soda lye vats dyeing cotton after exposure to air grayish-blue to blue to green shades remarkable for their fastness to chlorin.

In order to illustrate the new process more fully we can proceed as follows, the parts being by weight:—

Example A: 305 parts of dibromoisatin are converted in a dry benzene suspension into dibromoisatin chlorid by heating it with 210 parts of $PCl_5$. The mixture thus obtained is then poured into a hot solution which is well stirred of 175 parts of 4-oxyacenaphthene in dry benzene. The dye which separates on cooling is filtered off and washed. It is a blue crystalline powder soluble in hot benzene with a pure blue and in sulfuric acid with a greenish-blue color. By treatment with hydrosulfite and NaOH a yellow vat results from which cotton is dyed in fast pure blue shades. The formation of the color probably takes place according to the following formula:

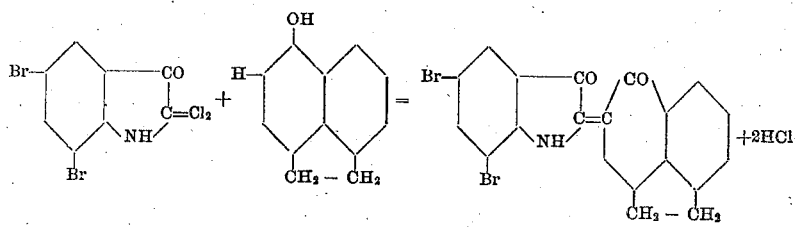

Example B: 222 parts of alpha-isatin-anilid and 170 parts of 4-oxyacenaphthene are heated with benzene and 5 parts of piperidin with a reflux condenser on the water bath until the formation of the dye is complete. The dye which separates in crystals is filtered off and washed. It crystallizes in blue-black crystals with a metallic luster and is soluble in hot nitrobenzene with a blue coloration and in cold concentrated sulfuric acid with an olive-brown color. It dyes cotton from a hydrosulfite vat after exposure to air in fast grayish blue shades fast to chlorin. The formation of the color probably takes place according to the following formula:

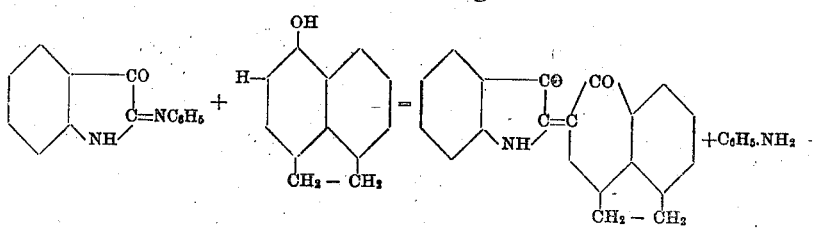

Instead of the above isatin derivative other may be used, *e. g.* chloro-, bromo-, chlorobromo- or dichloroisatin chlorid, ortho-bromo-para-methylisatin chlorid, tribromoisatin chlorid, para-bromo-ortho-methylisatin chlorid, ortho-para-dimethylisatin chlorid, chloro- or bromo-beta-naphthisatin chlorids such as dibromo-beta-naphthisatin chlorid, etc.

We claim:—

1. The herein described new dyestuffs obtainable from an isatin compound in which the oxygen of the alpha-keto group is replaced by an easily movable or replaceable substituent and 4-oxyacenaphthene, having the general formula:

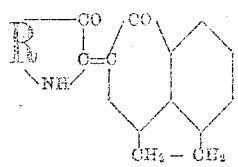

in which R stands for the isatin benzol nucleus, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air grayish-blue to blue to green shades remarkable for their fastness to chlorin, substantially as described.

2. The herein described new dyestuff obtainable from dibromoisatin-alpha-chlorid and 4-oxyacenaphthene, having the formula:

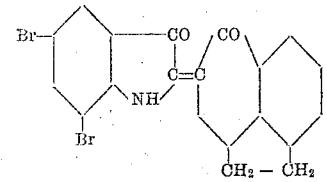

which dyestuff is in a dry state a blue crystalline powder, soluble in hot benzene with a pure blue and in concentrated sulfuric acid with a greenish-blue coloration, and which yields with hydrosulfite and caustic soda lye a yellow vat from which cotton is dyed a pure blue, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
  CHAS. J. WRIGHT,
  ALFRED HENKEL.